(12) United States Patent
Hudetz

(10) Patent No.: US 9,324,532 B2
(45) Date of Patent: Apr. 26, 2016

(54) FUSE FAILURE DISPLAY

(71) Applicant: PHOENIX CONTACT GMBH & CO. KG, Blomberg (DE)

(72) Inventor: Hans-Peter Hudetz, Hameln (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 14/422,160

(22) PCT Filed: Aug. 9, 2013

(86) PCT No.: PCT/EP2013/066760
§ 371 (c)(1),
(2) Date: Feb. 17, 2015

(87) PCT Pub. No.: WO2014/026933
PCT Pub. Date: Feb. 20, 2014

(65) Prior Publication Data
US 2015/0228435 A1    Aug. 13, 2015

(30) Foreign Application Priority Data
Aug. 16, 2012   (DE) .......................... 10 2012 107 525

(51) Int. Cl.
| | | |
|---|---|---|
| G08B 21/00 | (2006.01) | |
| H01H 85/32 | (2006.01) | |
| H02H 3/04 | (2006.01) | |
| H01H 85/02 | (2006.01) | |

(52) U.S. Cl.
CPC ............... *H01H 85/32* (2013.01); *H02H 3/046* (2013.01); *H01H 2085/0283* (2013.01)

(58) Field of Classification Search
CPC . H01H 85/32; H01H 285/0283; H01H 85/30; H01H 71/04; H01H 71/122; H01H 73/14; H01H 83/04; H01H 23/025; H01H 1/0015; H01H 31/127; H01H 9/181; H01H 9/161; H02H 3/046; H02H 3/04; G11C 29/027; G01R 31/07; G01R 19/165; G01R 31/026; H01L 23/5256

USPC .............. 340/638, 639, 641, 643, 635, 691.1, 340/693.5, 815.4, 815.45; 337/206, 241, 337/158, 266, 198; 324/507, 550, 537; 361/104, 117, 118; 200/308
See application file for complete search history.

(56) References Cited

U.S. PATENT DOCUMENTS

| | | | | |
|---|---|---|---|---|
| 5,343,192 A | * | 8/1994 | Yenisey | ................... G05B 9/02 335/17 |
| 6,696,969 B2 | * | 2/2004 | Torrez | .................. H01H 85/306 340/638 |

(Continued)

FOREIGN PATENT DOCUMENTS

| | | |
|---|---|---|
| DE | 28 31 139 A1 | 1/1980 |
| DE | 31 46 328 A1 | 6/1983 |

(Continued)

OTHER PUBLICATIONS

Office Action received in German counterpart application No. 10 2012 107 525.5, dated May 8, 2013, 10 pgs.

(Continued)

*Primary Examiner* — Anh V La
(74) *Attorney, Agent, or Firm* — Knobbe Martens Olson & Bear LLP

(57) ABSTRACT

Circuitry for fuse failure display for monitoring the trip status of a fuse is disclosed, wherein a light-emitting diode is provided in order to display the trip status of the fuse, which light-emitting diode is arranged in a current path parallel to the fuse. If the fuse is not tripped, the parallel current path has a high resistance in relation to the resistance across the fuse, such that the current across this current path is insufficient for operation of the light-emitting diode. If the fuse is tripped, this parallel current path has a low resistance in relation to the resistance across the fuse, such that the current across this current path is sufficient for operation of the light-emitting diode, wherein a current-limiting device for limiting the current across the light-emitting diode and a voltage-limiting device for limiting the voltage across the tripped fuse are also provided.

20 Claims, 1 Drawing Sheet

(56) References Cited

U.S. PATENT DOCUMENTS

| | | | | |
|---|---|---|---|---|
| 7,339,486 B2 * | 3/2008 | Huang | ............... | H01H 85/32 |
| | | | | 200/308 |
| 8,441,266 B1 * | 5/2013 | Xiao | ............... | G11C 17/18 |
| | | | | 324/537 |
| 2004/0051375 A1 | 3/2004 | Uno | | |
| 2004/0257191 A1 | 12/2004 | Müller | | |
| 2009/0213505 A1 | 8/2009 | Cornelius et al. | | |
| 2009/0273314 A1 | 11/2009 | Yoshikawa | | |

FOREIGN PATENT DOCUMENTS

| | | | |
|---|---|---|---|
| DE | 35 15 773 | A1 | 9/1985 |
| DE | 101 42 654 | A1 | 4/2003 |
| DE | 698 25 453 | T2 | 8/2005 |
| DE | 10 2005 040 432 | A1 | 3/2007 |
| EP | 1 383 223 | A2 | 1/2004 |

OTHER PUBLICATIONS

Written Opinion in related PCT application PCT/EP2013/066760, dated Nov. 20, 2013 (5 pgs), including English translation (5 pgs); 10 pages total.

International Search Report in related PCT application PCT/EP2013/066760, dated Nov. 20, 2013 (3 pgs), including English translation (2 pgs); 5 pages total.

* cited by examiner

FUSE FAILURE DISPLAY

CROSS REFERENCE TO RELATED APPLICATIONS

This application is a U.S. National Stage Application of International Application No. PCT/EP2013/066760, filed Aug. 9, 2013, published as WO2014/026933 A1, which claims priority from German Patent Application No. 10 2012 107 525.5, filed Aug. 16, 2012, published as DE102012107525A1, which are incorporated herein by reference in entirety.

The invention relates to a circuit for fuse failure display for monitoring the trip status of a fuse, wherein a light-emitting diode is provided in order to display the trip status of the fuse.

The invention is intended for use for monitoring fuses both in DC operation and in AC operation. It is suitable for wide-ranging use in order to monitor fuses in the low-voltage range from a few volts to several hundreds of volts. However, with appropriate dimensioning of the semiconductor components to be used, use in the high-voltage range is also possible in principle.

The need to be able to monitor the status of fuses optically or electronically is justified for many reasons. Small appliance fuses are often poorly accessible, and in addition the state of a fuse wire of a microfuse is often difficult to determine. In another power range, the positions of the circuit breakers of a domestic distribution system by way of example cannot be determined in the dark. In a further field of use an electric control or monitoring system may require the status of a fuse as sensor information for fault display or for the initiation of measures.

Solutions corresponding to the individual problem and tailored to the respective situation are known from the prior art and are often complex.

The object of the present invention is to specify a simple and economical circuit for fuse monitoring that can be used in a wide voltage range, can be provided in a small space and is suitable both for DC operation and for AC operation.

The object is achieved in accordance with the invention by the features of the independent claim. Advantageous embodiments of the invention are specified in the dependent claims.

In accordance with the invention a circuit arrangement for fuse failure display for monitoring the trip status of a fuse is thus provided, said circuit arrangement having a light-emitting diode in order to display the trip status of the fuse, which light-emitting diode is arranged in a current path parallel to the fuse, wherein, if the fuse is not tripped, this parallel current path has a high resistance in relation to the resistance across the fuse, such that the current across this current path is insufficient for operation of the light-emitting diode, and wherein, if the fuse is tripped, this parallel current path has a low resistance in relation to the resistance across the fuse, such that the current across this current path is sufficient for operation of the light-emitting diode, wherein a current-limiting device for limiting the current across the light-emitting diode and a voltage-limiting device for limiting the voltage across the tripped fuse are also provided, wherein when the fuse is not tripped a field-effect transistor and a resistor are provided in series in order to attain the high resistance of the parallel current path and when the fuse is tripped the same resistor is provided in order to arrange the current-limiting device in the parallel current path in order to form a control voltage for the field-effect transistor in the parallel current path with the light-emitting diode, the blocked state of the field-effect transistor being dependent on said control voltage.

In other words, following a failure of the fuse to be monitored, the circuit safeguarded by the fuse continues to remain closed over the parallel current path of the fuse failure display, wherein a current-limiting device limits the current across the fuse failure display and therefore simultaneously operates a light-emitting diode.

Here, the arrangement has a number of advantages. A first advantage lies in the fact that the circuit requires only very few components. The circuit therefore can be produced economically and with low spatial requirement. It can therefore be integrated in an existing housing in many fuse applications.

A further advantage lies in the fact that the circuit can be used independently of the operating voltage. Limited merely by the dielectric strength of the semiconductor, the field-effect transistor regulates the current through the parallel current path to a pre-set level, even with high voltages between the connection contacts of the fuse failure display, such that the light-emitting diode is not destroyed.

The arrangement is suitable both for DC operation and also AC operation, wherein in the latter case a half-wave rectification is preferably provided on account of the used light-emitting diode.

The circuit advantageously has a varistor that is arranged in a further parallel current path parallel to the fuse.

The advantage of such a voltage-dependent resistor is that the resistance thereof when a predefined threshold voltage is applied falls suddenly and said resistor therefore becomes conductive. Here, the predefined threshold voltage must be above the operating voltage, such that the varistor is conductive only for voltage spikes above the operating voltage and thus protects the parallel current path with the field-effect transistor.

The circuit to the voltage-limiting device advantageously has a capacitor that is arranged in a further parallel current path parallel to the fuse.

If the fuse is not tripped the poles of the capacitor are shorted via the fuse, such that the capacitor is fully discharged. Due to inductances in the circuit safeguarded by the fuse, voltage spikes could occur as the fuse is tripped if these were not compensated for by the capacitor. The circuit therefore advantageously has both a varistor and a capacitor.

The circuit is advantageously also formed in such a way that the series circuit comprises two additional diodes that frame the arrangement formed of field-effect transistor, resistor and light-emitting diode by way of example.

These diodes also offer additional protection against overvoltage to the field-effect transistor framed by said diodes. Furthermore, said diodes are suitable in the case of AC operation for performing the half-wave rectification and thus relieving the load on the light-emitting diode.

The circuit is advantageously also formed in such a way that the light-emitting diode is part of an optocoupler or the series circuit additionally comprises an optocoupler, via which a feedback or coupling to an evaluation electronics unit is possible.

Here, an optocoupler has the advantage of galvanic isolation from the circuit safeguarded by the fuse, such that possible voltage spikes cannot influence a downstream evaluation electronics unit, for example.

The field-effect transistor is advantageously formed as a MOSFET (metal oxide semiconductor field-effect transistor) that has a negative temperature coefficient, such that the resistance of said transistor rises if it is overloaded by an excessively high current.

For example, a self-conducting n-channel MOSFET that blocks the source-drain channel with increasing (negative)

gate voltage is suitable for forming the current regulation. When a current passes through the resistor of the circuit, a voltage suitable as control voltage is present across the resistor.

Furthermore, a flyback diode is advantageously arranged between the source and drain of the field-effect transistor, wherein the field-effect transistor can be formed such that it contains this flyback diode.

Due to the high susceptibility to overvoltage spikes, also caused by electrostatics, such a diode can additionally protect the field-effect transistor. The flyback diode is advantageously formed as a Zener diode, which conducts against the blocking direction from a predetermined threshold voltage. This advantageously can be integrated into the component of the field-effect transistor.

In an advantageous embodiment the circuit according to the invention comprises a varistor, a capacitor, a resistor, a field-effect transistor, a light-emitting diode and two diodes and also optionally an optocoupler. In this embodiment a good ratio of circuitry to reliable functionality and spatial requirement is attained.

A safety device advantageously comprises a fuse failure display having the previously described features. By way of example, this may be a series fuse terminal, a circuit breaker, a device for a G-fuse or a mount for a precision appliance fuse.

The invention will be explained in greater detail hereinafter with reference to the accompanying drawing on the basis of preferred embodiments.

In the drawing

Figure 1:
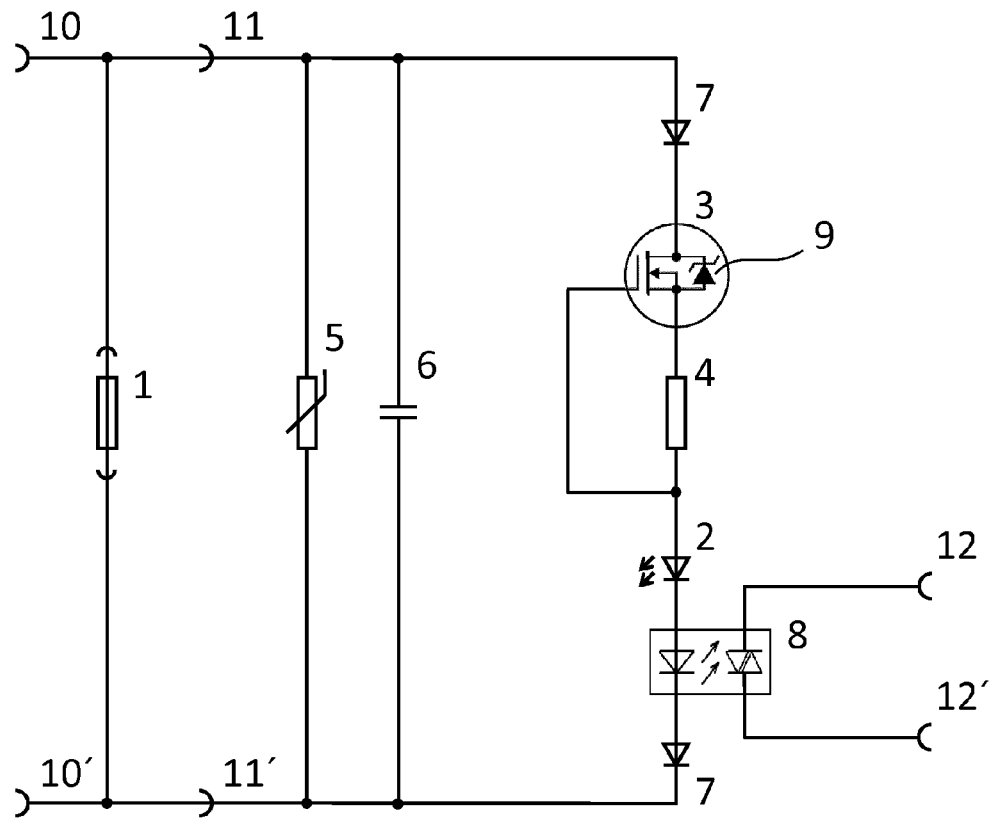
FIG. 1 shows a circuit for fuse failure display according to a preferred embodiment of the invention.

The circuit to be safeguarded via the fuse 1 can be connected to the fuse 1 via the connection contacts 10, 10'. The circuit of the fuse failure display is connected in parallel with the fuse 1 via the connection contacts 11, 11' of the fuse failure display.

The circuit of the fuse failure display has three parallel current paths between the connection contacts 11 and 11' thereof. A first runs via the varistor 5, a second via the capacitor 6 and a third via a series circuit formed of two diodes 7, an n-channel field-effect transistor 3 with integrated flyback diode 9, a resistor 4, a light-emitting diode 2 and an optocoupler 8. Where not specified in greater detail, reference to the parallel current path will be understood hereinafter to mean the series circuit last mentioned.

The sensor connections or connection contacts for the feedback 12, 12' of the optocoupler 8 are galvanically isolated from the circuit to be safeguarded and are connected by the optocoupler 8. If the fuse is not tripped the circuit to be safeguarded is closed both via the fuse 1 and via the parallel current path of the fuse failure display. Here, the fuse 1 and fuse failure display constitute a current divider from the viewpoint of the circuit to be safeguarded. The current is distributed in a manner inversely proportional to the resistance over the branches of the fuse and of the power failure display.

Since the resistor of the untripped fuse 1 is usually well below 1 ohm (close to 0 ohm), the parallel current path provided with the resistor 4 necessarily has a comparably high resistance. If the fuse 1 is not tripped the current flows virtually exclusively via the practically resistance-free fuse 1. The connection contacts of the fuse 10, 10' and also of the fuse failure display 11, 11' are at the same potential and the current flowing through the parallel current path is not high enough to be able to operate the light-emitting diode 2 of the fuse failure display.

The connections of the varistor 5 are at the same potential, such that this too is in a blocked state for lack of applied voltage. The capacitor 6 also constitutes an insulator if both poles are at the same potential. If the fuse 1 is in the tripped state it constitutes an insulator with practically infinite resistance. The circuit continues to be closed in this case, but from now on via the parallel current path of the fuse failure display.

The field-effect transistor 3 is formed as a self-conducting n-channel field-effect transistor, such that it already conducts without application of a gate voltage. At the moment of the fuse failure it is thus in the conducting state without considerable resistance.

Apart from the forward resistances of the diodes 2, 7 and 8, the resistance of the parallel current path is initially determined by the resistor 4. With increasingly rising current through the resistor 4, caused by the failure of the fuse 1, a voltage that is fed to the field-effect transistor 3 as negative control voltage between gate and source drops across the resistor 4. The field-effect transistor 3 thus transfers into the blocked state until the current flowing through has adjusted to a value predeterminable by the resistance value of the resistor 4.

The current through the parallel current path of the fuse failure display is thus, in a wide voltage range, independent of the operating voltage of the circuit to be safeguarded. If the voltage applied to the connection contacts 11, 11' exceeds a predefined threshold voltage of the varistor 5, this transfers into the conducting state, whereby the voltage between the connection contacts 11 and 11' is reduced. The capacitor 6 is also suitable for holding the voltage between the connection contacts 11 and 11' stable, such that the parallel current path is protected against voltage spikes.

Figure 2:
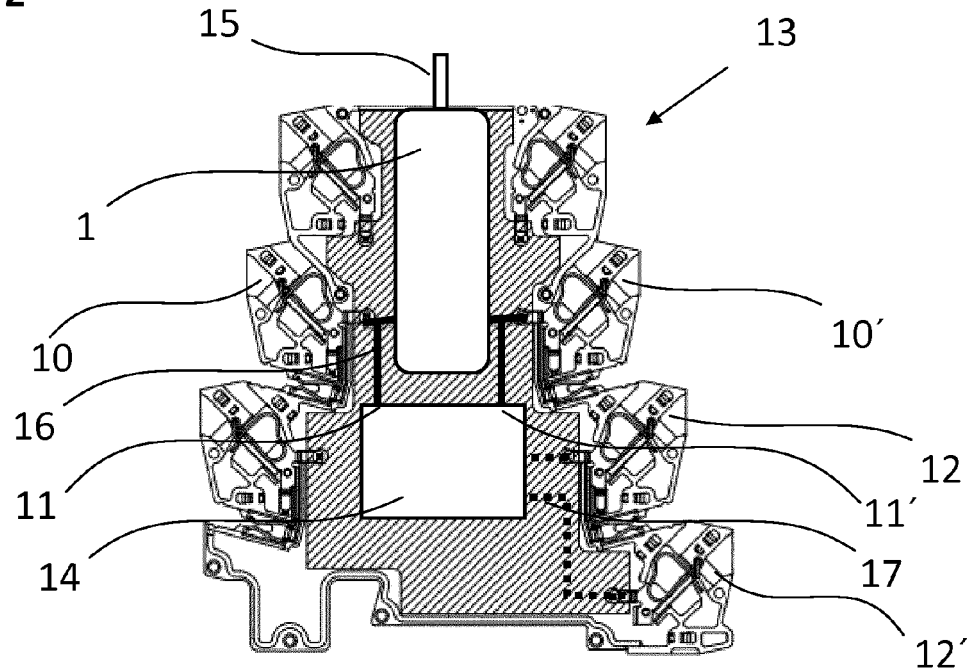
FIG. 2 shows a series fuse terminal with a fuse failure display for the purpose of monitoring the trip status of a fuse according to a preferred embodiment of the invention.

FIG. 2 shows an embodiment of a series fuse terminal 13 with a fuse failure display according to the invention. The circuit of the fuse failure display is arranged on a printed circuit board 14, which is integrated together with the fuse 1 into the series fuse terminal 13.

The series fuse terminal 13 has a plurality of connection contacts 10, 10', 12, 12', which can be formed as connection terminals, for example as push-ins. The circuit to be safeguarded is connected via the connection contacts 10, 10'. The feedback is connected optionally via the connection contacts 12, 12'. Here, it is possible to dispense with one of the connection contacts 12 or 12' with renunciation of the galvanic isolation.

The connection contacts 10, 10' are connected via the internal cabling of the fuse failure display to the fuse 1 and the connection contacts of the fuse failure display 11, 11'. The connection contacts 12, 12' of an optional feedback circuit are connected via the cabling of the feedback 17 to the optocoupler 8 of the circuit, said optocoupler also being optional. The fuse 1 can be actuated mechanically via the rotary device 15.

LIST OF REFERENCE SIGNS fuse 1
light-emitting diode 2
field-effect transistor 3
resistor 4
varistor 5
capacitor 6
diode 7
optocoupler 8 flyback diode 9
connection contact fuse 10, 10"
connection contact fuse failure display 11, 11"
connection contact feedback 12, 12"
series fuse terminal with fuse failure display 13
printed circuit board 14
rotary device 15
fuse failure display cabling 16
feedback cabling 17

The invention claimed is:

1. A circuit for fuse failure display for monitoring trip status of a fuse, the circuit comprising:
a light-emitting diode provided in order to display the trip status of the fuse;
a current path parallel to the fuse in which the light emitting diode is arranged; wherein, if the fuse is not tripped, the current path has a high resistance in relation to a resistance across the fuse, such that current in the current path is insufficient for operation of the light-emitting diode, and wherein, if the fuse is tripped, the current path has a low resistance in relation to the resistance across the fuse, such that the current in the current path is sufficient for operation of the light-emitting diode;
a current-limiting device for limiting the current through the light-emitting diode; and
a voltage-limiting device for limiting the voltage across the tripped fuse;
wherein, when the fuse is not tripped, a field-effect transistor and a resistor are provided in a series circuit in order to attain the high resistance of the current path and, when the fuse is tripped, the resistor is provided in order to arrange the current-limiting device in the parallel current path to provide a control voltage for the field-effect transistor in the current path with the light-emitting diode, wherein an off state of the field-effect transistor being dependent on said control voltage.

2. The circuit according to claim 1, wherein the voltage-limiting device comprises a varistor that is arranged in a further parallel current path parallel to the fuse.

3. The circuit according to claim 1 wherein the voltage-limiting device comprises a capacitor that is arranged in a further parallel current path parallel to the fuse.

4. The circuit according to claim 1, wherein the voltage-limiting device comprises a varistor and a capacitor.

5. The circuit according to claim 1 wherein the series circuit comprises two additional diodes, one positioned on each side of an arrangement formed of the field-effect transistor, the resistor, and the light-emitting diode.

6. The circuit according to claim 1 wherein the light-emitting diode is part of an optocoupler or the series circuit additionally comprises an optocoupler, via which a feedback or a coupling to an evaluation electronics unit is electrically connected.

7. The circuit according to claim 1 wherein the field-effect transistor is formed as a MOSFET.

8. The circuit according to claim 1 wherein a flyback diode is arranged between the source and drain of the field-effect transistor, wherein the field-effect transistor is formed such that it contains the flyback diode.

9. The circuit according to claim 1 wherein the circuit consists of a varistor, a capacitor, a resistor, a field-effect transistor, a light-emitting diode, diodes and an optocoupler.

10. A safety device that comprises a fuse failure display according to claim 1.

11. The circuit according to claim 4 wherein the varistor and the capacitor are arranged parallel to the fuse.

12. The circuit according to claim 1, wherein the voltage-limiting device consists of a varistor and a capacitor, wherein the varistor and the capacitor are arranged parallel to the fuse.

13. The circuit according to claim 2, wherein the voltage-limiting device further comprises a capacitor that is arranged in the further parallel current path parallel to the fuse.

14. The circuit according to claim 13, wherein the varistor and the capacitor are arranged parallel to the fuse.

15. The circuit according to claim 2, wherein the series circuit comprises two additional diodes, one positioned on each side of an arrangement formed of the field-effect transistor, the resistor, and the light-emitting diode.

16. The circuit according to claim 2, wherein the light-emitting diode is part of an optocoupler or the series circuit additionally comprises an optocoupler, via which a feedback or a coupling to an evaluation electronics unit is electrically connected.

17. The circuit according to claim 2, wherein a flyback diode is arranged between the source and drain of the field-effect transistor, wherein the field-effect transistor is formed such that it contains the flyback diode.

18. The circuit according to claim 3, wherein the series circuit comprises two additional diodes, one positioned on each side of an arrangement formed of the field-effect transistor, the resistor, and the light-emitting diode.

19. The circuit according to claim 3, wherein the light-emitting diode is part of an optocoupler or the series circuit additionally comprises an optocoupler, via which a feedback or a coupling to an evaluation electronics unit is electrically connected.

20. The circuit according to claim 3, wherein a flyback diode is arranged between the source and drain of the field-effect transistor, wherein the field-effect transistor is formed such that it contains the flyback diode.

* * * * *